United States Patent
Hu et al.

(10) Patent No.: US 8,196,334 B2
(45) Date of Patent: Jun. 12, 2012

(54) NET-MOUTH INCLINED TRAWL-NET APPARATUS

(75) Inventors: Fuxiang Hu, Tokyo-To (JP); Tadashi Tokai, Yokohama (JP); Daisuke Shiode, Tokyo-To (JP); Yoshioki Ozeki, Yokohma (JP); Hiroshi Kubota, Yokohama (JP)

(73) Assignee: National University Corporation Tokyo University of Marine Science and Technology, Tokyo (JP)

( * ) Notice: Subject to any disclaimer, the term of this patent is extended or adjusted under 35 U.S.C. 154(b) by 418 days.

(21) Appl. No.: 12/310,679

(22) PCT Filed: Mar. 30, 2007

(86) PCT No.: PCT/JP2007/057138
§ 371 (c)(1),
(2), (4) Date: Mar. 4, 2009

(87) PCT Pub. No.: WO2008/029533
PCT Pub. Date: Mar. 13, 2008

(65) Prior Publication Data
US 2009/0241404 A1  Oct. 1, 2009

(30) Foreign Application Priority Data
Sep. 6, 2006  (JP) .................................. 2006-241951

(51) Int. Cl.
*A01K 73/02* (2006.01)
*A01K 73/04* (2006.01)
(52) U.S. Cl. ............................................. 43/9.7; 43/9.1
(58) Field of Classification Search .............. 43/9.1–9.3, 43/9.7
See application file for complete search history.

(56) References Cited

U.S. PATENT DOCUMENTS

| 255,561 | A | * | 3/1882 | Arapian | 43/9.1 |
| 1,959,793 | A | * | 5/1934 | Lafredo et al. | 43/9.1 |
| 2,100,160 | A | * | 11/1937 | Dahl et al. | 43/9.1 |
| 2,137,663 | A | * | 11/1938 | Aspenburg | 43/9.1 |
| 2,244,907 | A | * | 6/1941 | Enright | 43/9.1 |

(Continued)

FOREIGN PATENT DOCUMENTS
GB  2 187 921  9/1987

(Continued)

OTHER PUBLICATIONS

International Search Report mailed Jun. 26, 2007 for International Application No. PCT/JP2007/057138.

(Continued)

*Primary Examiner* — Kimberly Berona
(74) *Attorney, Agent, or Firm* — Wenderoth, Lind & Ponack, L.L.P.

(57) ABSTRACT

A net-mouth inclined trawl-net apparatus includes a substantially rectangular frame and a trawl net attached to the frame. The trawl net is formed of an upper net, a lower net, and a pair of side nets, and the trawl net has a shape formed of a body part of a quadrangular trapezoid shape. Each of the side nets attached to the frame has a longer side and a shorter side as an upper side and a lower side, and a side of each side net defining a net-mouth edge defines a side-net front edge inclination angle relative to a bottom side of an isosceles trapezoid having the shorter side of the side net as a side of the isosceles trapezoid, so that the frame autonomously maintains an inclination angle relative to the vertical axis due to a flow resistance and a lift acting on the net.

7 Claims, 3 Drawing Sheets

U.S. PATENT DOCUMENTS 2,914,878 A * 12/1959 Persson et al. .................. 43/9.1
2010/0139147 A1 * 6/2010 Rokke et al. .................... 43/4.5

FOREIGN PATENT DOCUMENTS

| JP | 2000-102333 | 4/2000 |
| JP | 2003-052277 | 2/2003 |

OTHER PUBLICATIONS

International Preliminary Report on Patentability and Written Opinion of International Searching Authority mailed Mar. 26, 2009 for International Application No. PCT/JP2007/057138.

* cited by examiner

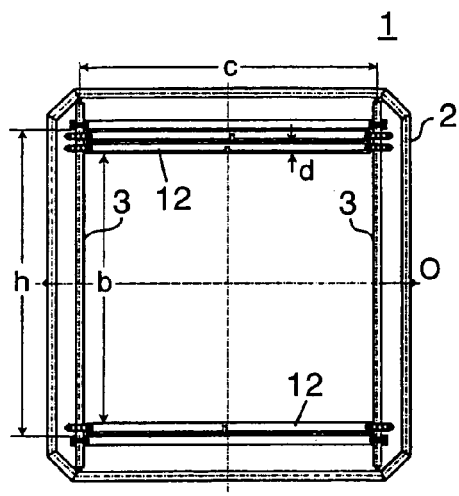
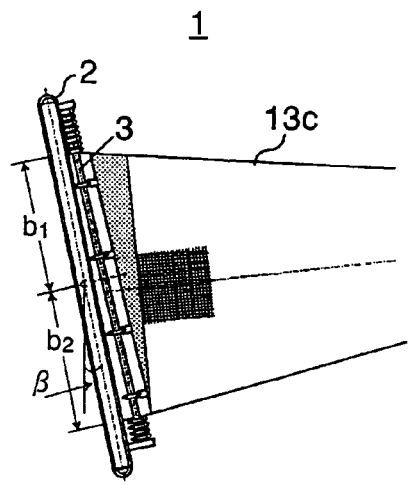
FIG. 2(a)   FIG. 2(b)
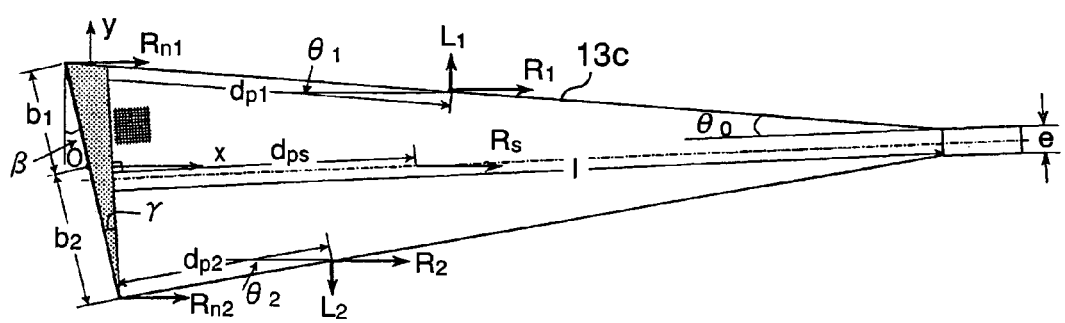
FIG. 2(c)

NET-MOUTH INCLINED TRAWL-NET APPARATUS

FIELD OF THE INVENTION

The present invention relates to a trawl-net collecting apparatus which can collect nektonic animals in the sea according to water depth, by towing a plurality of trawl nets, and by opening and closing net mouths depending on the water depth so as to switch the trawl nets for collecting animals.

In particular, the present invention relates to a trawl-net collecting apparatus of net-mouth inclination maintainable type, in which a frame towing the trawl nets can autonomously maintain a predetermined inclination angle ($\beta$) due to a flow resistance and a lift acting on the net, by providing a side-net front edge inclination angle ($\gamma$), which satisfies a predetermined relationship, at the net-mouth edge part of a side net of each of the trawl nets.

BACKGROUND ART

With a view to sustainable effective utilization of marine organism resources, there have been adopted the TAC (Total Allowable Catch) system and the TAE (Total Allowable Effort) system, which are intended for major fishes to be fished.

In order to improve a management effect of resources by these systems, it is necessary to exactly assess the resource amount for each kind of fishes. As one of the means therefor, larval and juvenile fishes are collected according to water depth.

In order to collect larval and juvenile fishes in each layer, there have been conventionally proposed a trawl-net collecting apparatus referred to as "MOCNESS", a trawl-net collecting apparatus referred to as "RMT", and a trawl-net collecting apparatus referred to as "LOCHNESS".

FIG. 3 generally shows a conventional LOCHNESS-type trawl-net collecting apparatus.

As shown in FIG. 3, the conventional LOCHNESS-type trawl-net collecting apparatus includes a rectangular cylindrical frame 22 for towing a plurality of trawl nets 21a, 21b, 21c, 21d.

The frame 22 includes therein plural pairs of vertical bars 23.

A horizontal slide bar 24 is extended between each of the pairs of vertical bars 23, the slide bar 24 having opposed ends thereof that are slidably engaged with the vertical bars 23.

A net-mouth edge of a lower net of the first trawl net 21a is anchored to the slide bar 24 between the first pair of vertical bars 23, and a net-mouth edge of an upper net of the first trawl net 21a is anchored to another slide bar 24 between the second pair of vertical bars 23.

Anchored to the slide bar 24 between the second pair of vertical bars 23 are the net-mouth edge of the upper net of the first trawl net 21a, and a net-mouth edge of a lower net of the second trawl net 21b.

Similarly, anchored to the slide bar 24 between the third pair of vertical bars 23 are a net-mouth edge of an upper net of the second trawl net 21b, and a net-mouth edge of a lower net of the third trawl net 21c. This is similar to the fourth and fifth slide bars 24. A net-mouth edge of an upper net of the trawl net and a net-mouth edge of a lower net of the trawl net adjacent thereto are anchored to the same slide bar.

The LOCHNESS-type trawl-net collecting apparatus 20 has, on an upper part thereof, locking devices 25 for locking the respective slide bars 24.

Outside the frame 22, floats 26 are disposed on opposed sides of the frame 22, so that a buoyancy of the LOCHNESS trawl-net collecting apparatus 20 can be adjusted.

Horizontal fin stabilizers 27 are disposed rearward the frame 22, so that a stance of the LOCHNESS-type trawl-net collecting apparatus 20 can be stabilized.

Net-towing wires 28 are connected to the upper parts of the LOCHNESS-type trawl-net collecting apparatus 20.

In all the conventional "MOCNESS", the "RMT", and the "LOCHNESS", the net-towing wires are connected to the upper parts of the trawl-net collecting apparatus. Thus, there is a problem in that, when a net-towing speed is increased, a net mouth may be steeply inclined by a water flow.

In the MOCNESS, a net-towing speed has to be limited to about 1.2 meter/second or less. However, even when a net-towing speed is between 0.7 and 1.2 meter/second, the net mouth may be inclined at 40° or more.

In the RMT, not only a shape of the net mouth tends to be changed but also the net mouth tends to be steeply inclined depending on a stage that is opened and a net-towing speed. Thus, a net-towing speed has to be limited to 1.0 meter/second or less.

In the LOCHNESS, in order to restrain an inclination of the frame relative to a net-towing direction, a weight of the frame is increased, and horizontal fin stabilizers for controlling a posture of the LOCHNESS are provided. Thus, the structure is complicated, and the LOCHNESS is difficult to be handled because of its heavy weight.

BRIEF SUMMARY OF THE INVENTION

The present invention is a trawl-net collecting apparatus of net-mouth inclination maintainable type in which a trawl net is attached to a substantially rectangular cylindrical frame, the trawl net being formed of an upper net, a lower net, and a pair of side nets, and the trawl net having a shape formed of a body part of a quadrangular trapezoid shape and a cod-end part connected to an end of the quadrangular trapezoidal body part, wherein each of the side nets attached to the frame has a longer side and a shorter side as an upper side and a lower side, and a side defining a net-mouth edge defines a side-net front edge inclination angle ($\gamma$), which satisfies a relationship represented by the following expression (1), relative to a bottom side of an isosceles trapezoid having the shorter side as a shorter leg, so that the frame autonomously maintains an inclination angle ($\beta$) due to a flow resistance and a lift acting on the net.

[Expression 1]

$$(y_1 C_{D\theta 1} - x_1 C_{L\theta 1})S_1 + (y_2 C_{D\theta 2} + x_2 C_{L\theta 2})S_2 + 2y_S C_{D\theta S} S_S + 2aw_f \sin\beta/(\rho\alpha V^2) = 0 \qquad (1)$$

In the above expression, the suffix 1 represents the upper net, the suffix 2 represents the lower net, and the suffix S represents the side net. $S_1$, $S_2$, and $S_3$ respectively represent areas of the upper net, the lower net, and the side net. $\theta_1$ represents an attack angle of the upper net against the water flow. $\theta_2$ represents an attack angle of the lower net against the water flow. $\theta_3$ represents an attack angle of the side net against the water flow. In addition, a represents a deviation of the net-towing wire connected to the frame from a center of the frame in a high direction thereof, $w_f$ represents a weight of the frame in water, $\rho$ represents a density of sea water, and V represents a net-towing speed.

Suppose that h represents a height of the net mouth, e represents a height of the cod-end part, and l represents a distance between a top side and the bottom side of the isosceles trapezoid having the shorter side as a shorter leg, the following expression is obtained.

[Expression 2]

$$\theta_0 = \tan^{-1}((h-e)/(2l)) \quad (2)$$

Suppose that $\beta$ represents an inclination angle of the frame relative to a net-towing direction, and $\gamma$ is a side-net front edge inclination angle, the following expressions are obtained.

[Expression 3]

$$\theta_1 = \theta_0 - (\beta - \gamma) \quad (3)$$

$$\theta_2 = \theta_0 + (\beta - \gamma) \quad (4)$$

$C_{D\theta}$ and $C_{L\theta}$ are a drag coefficient and a lift coefficient of the netting to be used for the trawl net, and are decided by a netting material and its structure and an attack angle $\theta$ of the netting against the water flow. In a coordinate surface in which a center of the frame in a high direction thereof is an original in which an x-axis is horizontal and a y-axis is vertical, $x_1$, $y_1$, $x_2$, and $y_2$ are coordinates of points of action of flow resistances and lifts of the upper net and the lower net, and $y_s$ is a coordinate of a point of action of a flow resistance of the side net, which are obtained as follows.

[Expression 4]

$$x_1 = d_{p1} \cos\theta_1 - b_1 \sin\beta \quad (5)$$

$$x_2 = d_{p2} \cos\theta_2 - b_2 \sin\beta \quad (6)$$

$$y_1 = b_1 \cos\beta - d_{p1} \sin\theta_1 \quad (7)$$

$$y_2 = d_{p2} \sin\theta_2 - b_2 \cos\beta \quad (8)$$

$$y_s = d_{pS} \sin(\beta - \gamma) \quad (9)$$

In the above expression, $b_1$ and $b_2$ are $b_1 = h/2 - a$ and $b_2 = h - b_1$, and $d_{p1}$, $d_{p2}$, and $d_{pS}$ are distances between a pressure center and the net mouth at attack angles $\theta_1$, $\theta_2$, and $\theta_S$ of the upper net, the lower net, and the side net relative to the flow.

The present invention is a trawl-net collecting apparatus of net-mouth inclination maintainable type, comprising: a substantially rectangular cylindrical frame configured to tow a plurality of trawl nets that are arranged in an up and down direction, each trawl net being formed of an upper net, a lower net, a pair of side nets, and the trawl net having a shape formed of a body part of a quadrangular trapezoid shape and a cod-end part connected to an end of the quadrangular trapezoidal body part, and the frame including an upper edge to which a net mouth edge of an upper net of the uppermost trawl net is anchored, and a lower edge to which a net mouth of a lower net of the lowermost trawl net is anchored; a pair of vertical bars disposed on opposed sides of the frame; and at least one substantially horizontal slide bar whose opposed ends are slidably engaged with the vertical bars, the slide bar anchoring thereto the net mouth edge of the lower net of the upper trawl net and the net mouth edge of the upper net of the lower trawl net; wherein each of the side nets of the body part of the n-th trawl net from below has a longer side and a shorter side as an upper side and a lower side, and a side defining a net-mouth edge defines a side-net front edge inclination angle ($\gamma$), which satisfies a relationship represented by the following expression (10, relative to a bottom side of an isosceles trapezoid having the shorter side as a shorter leg, so that the frame autonomously maintains an inclination angle ($\beta$) due to a flow resistance and a lift of a water flow against the net.

[Expression 5]

$$(y_1 C_{D\theta 1} - x_1 C_{L\theta 1}) S_1 + (y_2 C_{D\theta 2} + x_2 C_{L\theta 2}) S_2 + \\ 2 y_S C_{D\theta S} S_S + (h_1 C_{Dn1} - h_2 C_{Dn2}) S_n \cos\beta + \\ 2(n_2 h_2 w_b - n_1 h_1 w_b - a w_f) \sin\beta / (\rho \alpha V^2) = 0 \quad (10)$$

In the above expression, $S_1$, $S_2$, and $S_3$ represent areas of the upper net, the lower net, and the side net of the n-th trawl net from below. $S_n$ represents an area of the upper net of the closed trawl net. $n_1$ represents the number of closed trawl nets positioned above the n-th trawl net from below. $n_2$ represents the number of closed trawl nets positioned below the n-th trawl net from below. $W_b$ represents a weight of the slide bar in water. $W_f$ represents a weight of the frame excluding the slide bar. $\rho$ represents a density of sea water. $V$ represents a net-towing speed. $C_{D\theta}$ and $C_{L\theta}$ are a drag coefficient and a lift coefficient of the netting to be used for the trawl net, and are decided by a netting material and its structure and an attack angle $\theta$ of the netting against the water flow. The suffix 1 of $C_{D\theta}$ and $C_{L\theta}$ represents the upper net of the n-th trawl net from below, the suffix 2 thereof represents the lower net of the n-th trawl net from below, and the suffix S thereof represents the side net of the n-th trawl net from below. Suppose that b represents a height of the net mouth of the n-th trawl net from below, e represents a height of the cod-end part, and l represents a distance between a top side and the bottom side of the isosceles trapezoid having the shorter side as a shorter leg, the following expression is obtained.

[Expression 6]

$$\theta_0 = \tan^{-1}((b-e)/(2l)) \quad (11)$$

Suppose that $\beta$ represents an inclination angle of the frame relative to a net-towing direction, and $\gamma$ is a cut-out angle of the front edge of the side net, attack angles $\theta_1$ and $\theta_2$ of the upper net and the lower net of the n-th trawl net from below are obtained as follows.

[Expression 7]

$$\theta_1 = \theta_0 - (\beta - \gamma) \quad (12)$$

$$\theta_2 = \theta_0 + (\beta - \gamma) \quad (13)$$

As shown in FIG. 1, in a coordinate surface in which a center of the frame in a high direction thereof is an original in which an x-axis is horizontal and a y-axis is vertical, $x_1$, $y_1$, $x_2$, and $y_2$ are coordinates of points of action of flow resistances and lifts of the upper net and the lower net of the n-th trawl net from below, and $y_s$ is a coordinate of a point of action of a flow resistance of the side net of the n-th trawl net from below, which are obtained as follows.

[Expression 8]

$$x_1 = d_{p1} \cos\theta_1 - b_1 \sin\beta \quad (14)$$

$$x_2 = d_{p2} \cos\theta_2 - b_2 \sin\beta \quad (15)$$

$$y_1 = b_1 \cos\beta - d_{p1} \sin\theta_1 \quad (16)$$

$$y_2 = d_{p2} \sin\theta_2 - b_2 \cos\beta \quad (17)$$

$$y_s = d_{pS} \sin(\beta - \gamma) \quad (18)$$

Suppose that a represents a deviation of the net-towing wire connected to the frame from a center of the frame in a high direction thereof, and that h represents a height of the frame to which the trawl nets are attached, $b_1$ and $b_2$ are $b_1 = (h/2 - a) - n1 \cdot d$, $b_2 = b - b_1$, and $h_1$ and $h_2$ respectively represent distances of the trawl nets positioned above and below the n-th trawl net from below from the connection point of the net-towing wire. d represents a height of the slide bar. $d_{p1}$, $d_{p2}$, and $d_{pS}$ are distances between a pressure center and the net mouth at attack angles $\theta_1$, $\theta_2$, and $\theta_S$ of the upper net, the lower net, and the side net relative to the flow.

The net-mouth edge of the side net of the trawl net may be slidably anchored to the vertical bars.

A net-towing wire may be connected to a predetermined high position of the frame in a high direction thereof.

In the present invention, the net-mouth front edge of the side net of the trawl net has a predetermined inclination angle ($\gamma$).

In the trawl net having the cod-end part, the side net of the body part (part excluding the cod-end part) of the trawl net has a longer side and a shorter side as an upper side and a lower side, and a side defining the net-mouth edge defines a side-net front edge inclination angle $\gamma$ which satisfies the following expression (1) relative to a bottom side of an isosceles trapezoid having the shorter side as a shorter leg.

[Expression 9]

$$(y_1 C_{D\theta 1} - x_1 C_{L\theta 1})S_1 + (y_2 C_{D\theta 2} + x_2 C_{L\theta 2})S_2 + 2y_S C_{D\theta S}S_S + 2aw_f \sin\beta/(\rho\alpha V^2) = 0 \quad (1)$$

In the above expression, the suffix 1 represents the upper net, the suffix 2 represents the lower net, and the suffix S represents the side net. $S_1$, $S_2$, and $S_3$ respectively represent areas of the upper net, the lower net, and the side net. $\theta_1$ represents an attack angle of the upper net against the water flow. $\theta_2$ represents an attack angle of the lower net against the water flow. $\theta_3$ represents an attack angle of the side net against the water flow. In addition, a represents a deviation of the net-towing wire connected to the frame from a center of the frame in a high direction thereof, $w_f$ represents a weight of the frame in water, $\rho$ represents a density of sea water, and V represents a net-towing speed.

Namely, the expression (1) shows a condition in which a rotating force about the connection point of the net-towing wire of flow resistances and lifts acting on the upper net, the lower net, and the side net becomes zero (0) at the attack angles $\theta_1$, $\theta_2$, and $\theta_S$.

Suppose that h represents a height of the net mouth, e represents a height of the cod-end part, and l represents a distance between a top side and the bottom side of the isosceles trapezoid having the shorter side as a shorter leg, the following expression is obtained.

[Expression 10]

$$\theta_0 = \tan^{-1}((h-e)/(2l)) \quad (2)$$

Suppose that $\beta$ represents an inclination angle of the frame relative to a net-towing direction, and $\gamma$ is a side-net front edge inclination angle, the following expressions are obtained.

[Expression 11]

$$\theta_1 = \theta_0 - (\beta - \gamma) \quad (3)$$

$$\theta_2 = \theta_0 + (\beta - \gamma) \quad (4)$$

Namely, due to the provision of the inclination angle ($\beta$) of the frame and the side-net front edge inclination angle ($\gamma$), the attack angles $\theta_1$ and $\theta_2$ of the upper net and the lower net are varied, so that flow resistances and lifts acting on the upper net and the lower net of the trawl net are varied.

By suitably selecting the inclination angle ($\beta$) of the net mouth of the trawl net and the side-net front edge inclination angle ($\gamma$) of the trawl net, a rotating force about the connection point of the net-towing wire can be made zero (0) which is shown in the expression (1). Thus, it can be understood that the trawl net can be maintained to a predetermined posture, and the net mouth can be maintained at a predetermined inclination.

The present invention employs this principle. In order to control the inclination angle ($\beta$) of the frame to be maintained at a predetermined angle, a certain value has been previously substituted for the inclination angle ($\beta$) of the frame in the expression (1), and $C_{D\theta}$ and $C_{L\theta}$, $S_1$, $S_2$, and $S_S$, and $x_1$, $y_1$, $x_2$, $y_2$ and $y_s$, which are obtained from dimensions and shapes of the upper net, the lower net, and the side net of the trawl nets, are substituted for the expression (1), so as to obtain the side-net front edge inclination angle ($\gamma$) of the trawl net. Then, the front-edge (net-mouth edge) part of the side net of the trawl net is cut down at the side-net front edge inclination angle ($\gamma$), so that the trawl-net collecting apparatus is formed.

According to the present invention, when the frame is inclined at an angle other than the intended inclination angle ($\beta$) relative to the side-net front edge inclination angle ($\gamma$) of the trawl net, a rotating force occurs about the connection point of the net-towing wire. Thus, the inclination of the frame is stabilized at the intended inclination angle ($\beta$).

Therefore, in the trawl-net collecting apparatus of net-mouth inclination maintainable type of the present invention, the frame can be autonomously stabilized and maintained at the inclination angle ($\beta$) due to a flow resistance and a lift of the net.

The present invention may be applied to a trawl-net collecting apparatus towing a plurality of trawl nets that are arranged in an up and down direction.

The trawl-net collecting apparatus of net-mouth inclination maintainable type comprises: a frame configured to tow a plurality of trawl nets that are arranged in an up and down direction; a pair of vertical bars disposed on opposed sides of the frame; and at least one substantially horizontal slider whose opposed ends are slidably engaged with the vertical bars; wherein a net-mouth edge of an upper net of the uppermost trawl net is anchored to an upper edge of the frame, a net-mouth edge of a lower net of the lowermost trawl net is anchored to a lower edge of the frame, and the net-mouth edge of the lower net of the upper trawl net and the net-mouth edge upper net of the lower trawl net are anchored of the slide bar.

At first, all the slide bars are locked on the upper ends of the vertical bars, so that the lowermost trawl net is opened. When the slide bars slide down one by one along the vertical bars, the opened trawl nets are sequentially switched.

In the trawl-net collecting apparatus of net-mouth inclination maintainable type, each of the towed trawl nets that are arranged in the up and down direction has a predetermined inclination angle ($\gamma$) at a front edge of the net mouth of the side net.

In the trawl net having the cod-end part, the side net of the body part (part excluding the cod-end part) of the n-th trawl net from below has a longer side and a shorter side as an upper side and a lower side, and a side defining the net-mouth edge defines a side-net front edge inclination angle $\gamma$ which satisfies the following expression (10) relative to a bottom side of an isosceles trapezoid having the shorter side as a shorter leg.

[Expression 12]

$$(y_1 C_{D\theta 1} - x_1 C_{L\theta 1})S_1 + (y_2 C_{D\theta 2} + x_2 C_{L\theta 2})S_2 + \\ 2y_S C_{D\theta S}S_S + (h_1 C_{Dn1} - h_2 C_{Dn2})S_n \cos\beta + \\ 2(n_2 h_2 w_b - n_1 h_1 w_b - aw_f)\sin\beta/(\rho\alpha V^2) = 0 \quad (10)$$

In the above expression, $S_1$, $S_2$, and $S_3$ represent areas of the upper net, the lower net, and the side net of the n-th trawl net from below. $S_n$ represents an area of the upper net of the closed trawl net. $n_1$ represents the number of closed trawl nets positioned above the n-th trawl net from below. $n_2$ represents the number of closed trawl nets positioned below the n-th trawl net from below. $W_b$ represents a weight of the slide bar in water. $W_f$ represents a weight of the frame excluding the slide bar. ρ represents a density of sea water. V represents a net-towing speed. $C_{D\theta}$ and $C_{L\theta}$ are a drag coefficient and a lift coefficient of the netting to be used for the trawl net, and are decided by a netting material and its structure and an attack angle θ against the water flow of the netting. The suffix 1 of $C_{D\theta}$ and $C_{L\theta}$ represents the upper net of the n-th trawl net from below, the suffix 2 thereof represents the lower net of the n-th trawl net from below, and the suffix S thereof represents the side net of the n-th trawl net from below. b represents a height of the net mouth, e represents a height of the cod-end part, and l represents a distance between a top side and the bottom side of the isosceles trapezoid having the shorter side as a shorter leg. In this case, the following expression is obtained.

[Expression 13]

$$\theta_0 = \tan^{-1}((b-e)/(2l)) \qquad (11)$$

Suppose that β represents an inclination angle of the frame relative to a net-towing direction, and γ is a cut-out angle of the front edge of the side net, attack angles $\theta_1$ and $\theta_2$ of the upper net and the lower net of the n-th trawl net from below are obtained as follows.

[Expression 14]

$$\theta_1 = \theta_0 - (\beta - \gamma) \qquad (12)$$

$$\theta_2 = \theta_0 + (\beta - \gamma) \qquad (13)$$

As shown in FIG. 1, in a coordinate surface in which a center of the frame in a high direction thereof is an original in which an x-axis is horizontal and a y-axis is vertical, $x_1, y_1, x_2,$ and $y_2$ are coordinates of points of action of flow resistances and lifts of the upper net and the lower net of the n-th trawl net from below, and $y_s$ is a coordinate of a point of action of a flow resistance of the side net of the n-th trawl net from below, which are obtained as follows.

[Expression 15]

$$x_1 = d_{p1} \cos\theta_1 - b_1 \sin\beta \qquad (14)$$

$$x_2 = d_{p2} \cos\theta_2 - b_2 \sin\beta \qquad (15)$$

$$y_1 = b_1 \cos\beta - d_{p1} \sin\theta_1 \qquad (16)$$

$$y_2 = b_{p2} \sin\theta_2 - b_2 \cos\beta \qquad (17)$$

$$y_s = d_{pS} \sin(\beta - \gamma) \qquad (18)$$

Suppose that a represents a deviation of the net-towing wire connected to the frame from a center of the frame in a high direction thereof, and that h represents a height of the frame to which the trawl nets are attached, $b_1$ and $b_2$ are $b_1 = (h/2 - a) - n_1 \cdot d$, $b_2 = b - b_1$, and $h_1$ and $h_2$ respectively represent distances of the trawl nets positioned above and below the n-th trawl net from below from the connection point of the net-towing wire. d represents a height of the slide bar. $d_{p1}, d_{p2},$ and $d_{pS}$ are distances between a pressure center and the net mouth at attack angles $\theta_1, \theta_2,$ and $\theta_S$ of the upper net, the lower net, and the side net relative to the flow.

The expression (10) shows that, since the frame has the inclination angle (β) and the side-net front edge of the n-th trawl net from below has the side-net front edge inclination angle (γ), the attack angles $\theta_1$ and $\theta_2$ of the upper net and the lower net are varied, so that flow resistances and lifts acting on the upper net and the lower net of the trawl net are varied. When the inclination angle (β) of the frame and the side-net front edge inclination angle (γ) of the n-th trawl net from below satisfy the predetermined relationship (relationship of expression (10)), a rotating force about the connection point of the net-towing wire becomes zero.

In other words, by providing the side-net front edge inclination angle (γ) to the side-net front edge of the n-th trawl net from below, the frame causes a rotating force about the connection point of the net-towing wire at an inclination angle other than the inclination angle (β) obtained from the expression (10), whereby the frame can be autonomously stabilized at the inclination angle (β).

Thus, by suitably selecting the side-net front edge inclination angle (γ) of the n-th trawl net from below, the inclination angle (β) of the frame can be maintained to be constant by the expression (10).

By providing a side-net front edge inclination angle (γ) of the side-net front edge of every trawl net to be towed relative to a predetermined frame inclination angle (β), the inclination angle of the frame can be maintained at the certain inclination angle (β) when every trawl net is switched to be opened.

According to the present invention, since an effect given by a net-towing speed on a balance of a rotating force about the connection point of the net-towing wire is small, the frame of the trawl-net collecting apparatus can be autonomously stabilized and maintained at a certain inclination angle even at a fast high net-towing speed.

Therefore, there can be realized the trawl-net collecting apparatus of net-mouth inclination maintainable type in which an inclination of the frame of the trawl-net collecting apparatus can be maintained to be constant even at a fast high net-towing speed.

In addition, according to the present invention, since it is not necessary to uselessly increase a weight of the apparatus in order to stabilize a posture of the trawl-net collecting apparatus, there can be achieved the trawl-net collecting apparatus of net-mouth inclination maintainable type which is lightweight but can stabilize a posture thereof.

BRIEF DESCRIPTION OF THE DRAWINGS

FIGS. 2(a) to 2(c) are views for explaining a calculation method for making zero a rotation moment of the trawl net about a connection point of a net-towing wire.

DETAILED DESCRIPTION OF THE INVENTION

An embodiment of the present invention will be described below with reference to the accompanying drawings.

Figure 1:
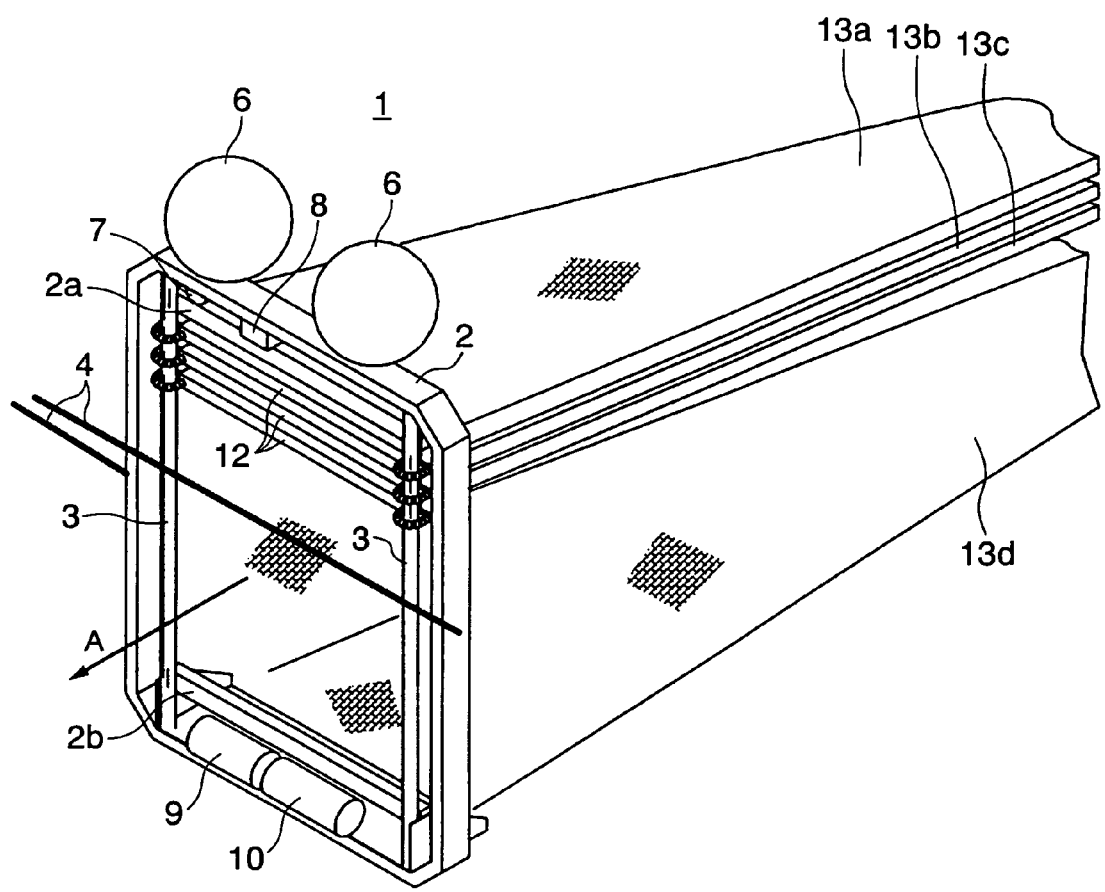
FIG. 1 is a perspective view of a trawl-net collecting apparatus of net-mouth inclination maintainable type in one embodiment of the present invention.
Figure 3:
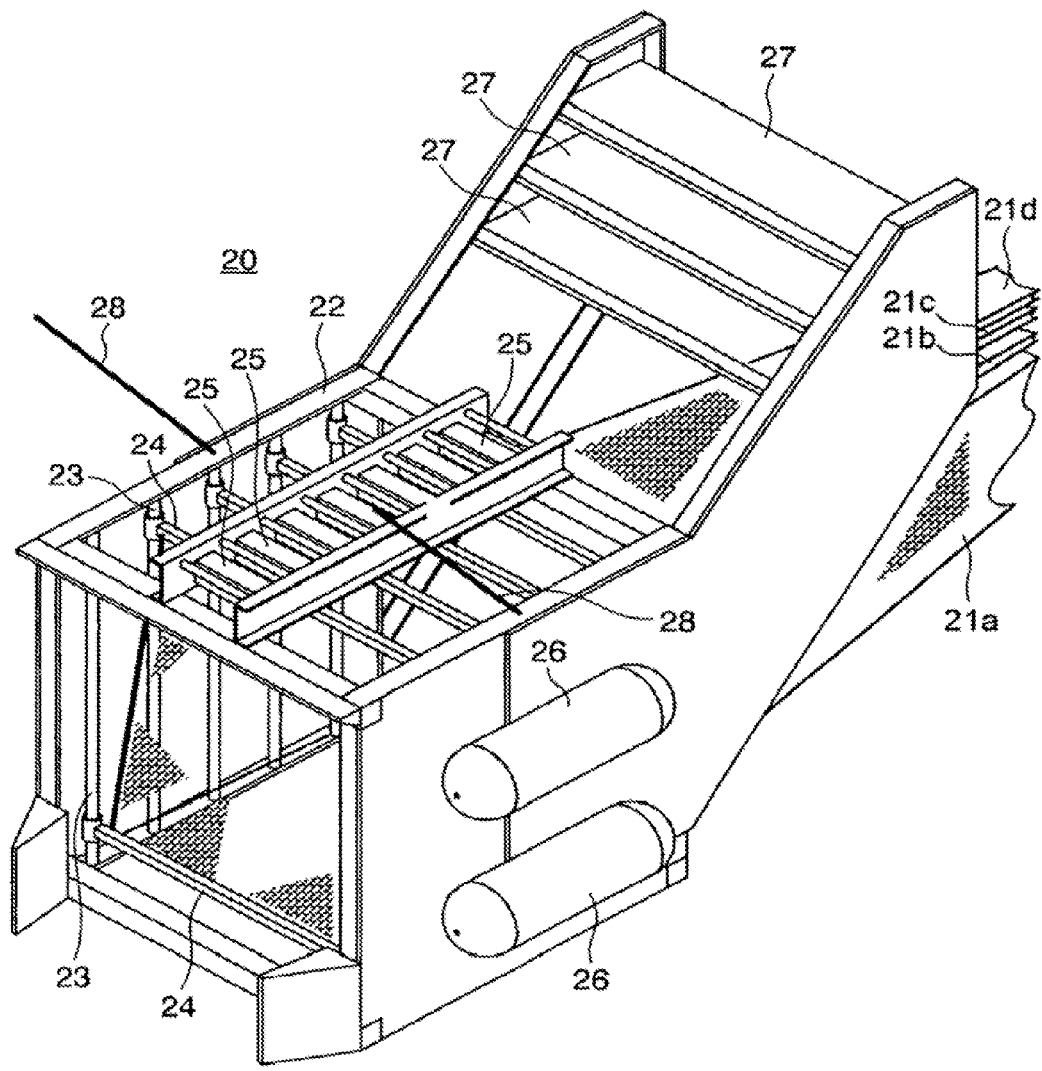
FIG. 3 is a perspective view generally showing a LOCH-NESS which is a conventional apparatus for layered collection with trawl nets.

FIG. 1 shows a trawl-net collecting apparatus of a net-mouth inclination maintainable type in one embodiment of the present invention.

FIG. 1 is a perspective view of a trawl-net collecting apparatus of net-mouth inclination maintainable type 1 in this embodiment.

As shown in FIG. 1, the trawl-net collecting apparatus of net-mouth inclination maintainable type 1 includes a substantially rectangular cylindrical frame 2. Inside the cylindrical frame 2, a pair of vertical bars 3 are disposed on opposed sides of the frame 2.

In this embodiment, the vertical bars 3 are disposed separately from the frame 2 on the opposed sides of the frame 2.

However, the present invention includes a structure in which a part of a vertical edge of the frame 2 serves also as the vertical bar. In this case, a member functioning as the frame and a member functioning as the vertical bar are respectively referred to as a frame and a vertical bar in this specification.

Ends of net-towing wires 4 are connected to center parts of the frame 2 in a high direction thereof.

The arrow A in FIG. 1 shows a net-towing direction by the net-towing wires 4.

A pair of floats 6 are disposed above the frame 2. In the drawings, the float 6 has a spherical shape and suspends the frame 2 from above. However, a shape of the float is optional, and a position thereof is also optional.

A flowmeter 7 and a net-mouth opening and closing unit 8 are disposed on an upper part of the frame 2.

The net-mouth opening and closing unit 8 is described hereinafter.

A controller 9 for controlling an operation of the net-mouth opening and closing unit 8 and a bathometer 10 are disposed on a lower part of the frame 2.

A horizontal member 2a is secured to upper ends of the vertical bars 3, and a horizontal member 2b is secured to lower ends of the vertical bars 3.

The horizontal members 2a and 2b are members separated from a body of the frame 2. However, similarly to the body of the frame 2, since the horizontal members 2a and 2b fixedly constitute a skeleton of the apparatus for layered collection with trawl nets 1, the horizontal members 2a and 2b are parts of the frame 2. Namely, the frame 2 includes a member separated from the body, as long as the member functions as the frame.

Disposed between the horizontal member 2a and the horizontal member 2b are a plurality of (three in this embodiment) substantially horizontal slide bars 12 whose opposed ends are slidably engaged with the vertical bars 3.

The trawl-net collecting apparatus of net-mouth inclination maintainable type 1 tows a plurality of (four in this embodiment) trawl nets 13a, 13b, 13c, and 13d.

A net-mouth edge of an upper net of the uppermost trawl net 13a is anchored to the horizontal member 2a (the upper edge of the frame 2), and a net-mouth edge of a lower net of the lowermost trawl net 13d is anchored to the horizontal member 2b (the lower edge of the frame 2).

Anchored to each of the slide bars 12 are a net-mouth edge of a lower net of the trawl net which is above the certain slide bar, and a net-mouth edge of an upper net of the trawl net which is below the certain slide bar.

Side nets of all the trawl nets 13a, 13b, 13c, and 13d are anchored to the slide bars 12.

At first, all the slide bars 12 are locked on the upper ends of the vertical bars 3 by the net-mouth opening and closing unit 8. The locked slide bars 12 are unlocked one by one, so that the unlocked slide bar 12 slides down by its own weight along the vertical bars 3.

The net-mouth opening and closing unit 8 is a means that locks all the slide bars 12 on the upper ends of the vertical bars 3 at first, and then unlocks the locked slide bars 12 one by one, by a given engagement mechanism.

The engagement mechanism may be a mechanism disclosed in JP3-15016U. However, not limited thereto, the engagement mechanism may be suitably invented by those skilled in the art.

As described above, since the trawl nets 13a, 13b, 13c, and 13d are anchored to the horizontal members 2a and 2b and the slide bars 12, the opening and closing of the net mouths can be switched by a slide-down of the slide bars 12.

In the state shown in FIG. 1, for example, the lowermost trawl net 13d is opened. When the lowermost slide bar 12 slides down, the net mouth of the trawl net 13d is closed, and the net mouth of the trawl net 13c anchored to the lowermost slide bar 12 and the second lowermost slide bar 12 is opened. Similarly, by the slide-down of each slide bar 12, the opened trawl net is closed and the closed trawl net is opened, sequentially.

FIG. 2 shows calculation dimension conditions of the trawl-net collecting apparatus of net-mouth inclination maintainable type in one embodiment of the present invention, in which a rotating force about the connection point of the net-towing wire is zero when a frame inclination angle is $\beta$ and an inclination angle of a side-net front edge is $\gamma$.

FIG. 2(*a*) is a front view of the trawl-net collecting apparatus of net-mouth inclination maintainable type 1 in this embodiment. FIG. 2(*b*) is a side view of a part near the frame 2 of the trawl-net collecting apparatus of net-mouth inclination maintainable type 1. FIG. 2(*c*) is a side view of the trawl net 13c which is opened.

In FIG. 2(*b*), only the opened trawl net 13 is shown, and illustration of the trawl nets 13a, 13b, and 13d is omitted.

In this embodiment, each of the trawl nets 13a, 13b, 13c, and 13d is formed of an upper net, a lower net, and a pair of side nets. Each of the trawl nets 13a to 13d has a shape formed of a body part of a quadrangular trapezoid shape, and a cod-end part connected to an end of the quadrangular trapezoidal body part. The trawl net of the present invention does not necessarily, strictly have the above shape, and it is sufficient for the trawl net to have a substantially quadrangular pyramid shape.

When the n-th trawl net from below is opened, the number of the trawl nets positioned above the opened trawl net is n1, and the number of the trawl nets positioned below the opened trawl net is n2 (in the example shown in FIG. 2, the trawl net 13c which is second from below is opened, n1=2, and n2=1).

In this embodiment, the frame 2 has a symmetric shape in an up and down direction about the connection point O to which the net-towing wire 4 is connected, excluding the slide bars 12.

A position of the connection point O of the net-towing wire 4 can be suitably set on the frame 2 in a high direction thereof.

Suppose that effects given by the attachments of the frame 2, such as the flowmeter 7, the net-mouth opening and closing unit 8, the controller 9, and the bathometer 10, to the inclination of the frame 2 are negligible, and that a resistance of the slide bar 12 is included in a resistance of the trawl net.

The side net of the body part (part excluding the cod-end part) of the trawl net 13c has a longer side and a shorter side as an upper side and a lower side (in the example shown in FIG. 2, although the side net has the longer side as an upper side and the shorter side as a lower side, the present invention is not limited thereto), and a side defining the net-mouth edge defines an inclination angle $\gamma$ of the side-net front edge relative to a bottom side of an isosceles trapezoid having the shorter side as a shorter leg.

Suppose that a height of the net mouth excluding the slide bar is b, that a height of the cod-end part of the trawl net 13c is e, and that a distance between a top side and the bottom side of the isosceles trapezoid, which has the shorter leg as a shorter side, of the side net of the trawl net 13c is l, an inclination angle (an angle that is one-half an angle defined between the upper and lower sides of the side net of the trawl net 13c) $\theta_0$ of the side net of the trawl net 13c relative to a center line between the upper side and the lower side can be represented as follows.

[Expression 16]

$$\theta_0 = \tan^{-1}((b-e)/(2l)) \quad (19)$$

Since the frame has the inclination angle $\beta$ (positive in clockwise) and the side-net front edge of the trawl net 13c has the side-net front edge inclination angle $\gamma$, an attack angle $\theta_1$ of the upper net of the trawl net 13c and an attack angle $\theta_2$ of the lower net of the trawl net 13c are as follows.

[Expression 17]

$$\theta_1 = \theta_0 - (\beta - \gamma) \quad (20)$$

$$\theta_2 = \theta_0 + (\beta - \gamma) \quad (21)$$

In a rectangular coordinate system in which the connection point O of the net-towing wire 4 is an origin, suppose that $R_1$, $R_2$, and $R_3$ respectively represent resistances acting on the upper net, the lower net, and the side net of the trawl net 13c, that $L_1$ and $L_2$ respectively represent lifting forces acting on the upper net and the lower net of the trawl net 13c, that $R_{n1}$, and $R_{n2}$ respectively represent a resistance acting on the trawl net positioned above the trawl net 13c and a resistance acting on the trawl net positioned below the trawl net 13c, that $h_1$ and $h_2$ respectively represent a distance from the connection point O of the net-towing wire to the trawl net positioned above the trawl net 13c and a distance from the connection point O of the net-towing wire to the trawl net positioned below the trawl net 13c ($h_1 = (h-n_1 d)/2$, $h_2 = (h-n_2 d)/2$ in which d represents a height of the slide bar), and that $w_b$ is a weight of the slide bar in water. In this case, since a rotation moment about the connection point O of the net-towing wire has to be made zero in order that the frame 2 can maintain the inclination angle $\beta$ during a net towing operation, the following expression is obtained.

[Expression 18]

$$(R_1 y_1 + R_2 y_2 + 2R_s y_s) + (L_2 x_2 - L_1 x_1) + \quad (22)$$
$$(h_1 R_{n1} - h_2 R_{n2})\cos\beta + (n_2 h_2 - n_1 h_1) w_b \sin\beta = 0$$

The resistances are obtained as follows.
[Expression 19]

$$R_{n1} = 1/2 \rho C_{Dn1} S_{n1} \alpha V^2 \quad (23)$$

$$R_{n2} = 1/2 \rho C_{Dn2} S_{n2} \alpha V^2 \quad (24)$$

$$R_1 = 1/2 \rho V^2 \alpha C_{D\theta 1} S_1 \quad (25)$$

$$R_2 = 1/2 \rho V^2 \alpha C_{D\theta 2} S_2 \quad (26)$$

$$R_s = 1/2 \rho V^2 \alpha C_{D\theta S} S_S \quad (27)$$

The lifting forces are obtained as follows.
[Expression 20]

$$L_1 = 1/2 \rho V^2 \alpha C_{L\theta 1} S_1 \quad (28)$$

$$L_2 = 1/2 \rho V^2 \alpha C_{L\theta 2} S_2 \quad (29)$$

Herein, $S_1$, $S_2$, and $S_S$ respectively represent areas of the upper net, the lower net, and the side net of the trawl net 13c. $S_{n1}$ and $S_{n2}$ respectively represent single-face areas of the closed trawl nets positioned above and below the trawl net 13c. $\rho$ represents a density of sea water. V represents a net-towing speed.

A drag coefficient $C_{D\theta}$ and a lift coefficient $C_{L\theta}$ of the netting at the attack angle of $\theta$ can be represented as follows.

[Expression 21]

$$C_{D\theta} = C_{D0} \cos^2\theta + C_{D90} \sin\theta - 3\alpha \sin^2\theta \cos^3\theta \quad (30)$$

$$C_{L\theta} = C_{D90} \sin^2\theta \cos\theta \cos^2\phi + 2\alpha \sin\theta \cos^2\theta \sin^2\phi \quad (31)$$

$\phi$ represents a mesh angle ($\phi = 45°$) of the netting of the trawl net. $C_{D90}$ and $C_{D0}$ represent a resistance coefficient of the netting of the trawl net perpendicular to the flow and a resistance coefficient of the netting of the trawl net in parallel with the flow, which can be obtained by a material of the trawl net, a mesh angle, and a mesh factor $\alpha$. $C_{Dn1}$ and $C_{Dn2}$ represent resistance coefficients of the closed trawl nets positioned above and below the trawl net 13c.

[Expression 22]

$$C_{Dn1} = C_{D0}(1 + 0.8 \cdot n_1^{0.7}) \quad (32)$$

$$C_{Dn2} = C_{D0}(1 + 0.8 \cdot n_2^{0.7}) \quad (33)$$

By substituting the expressions (23) to (31) to the expression (22), the following expression (34) can be obtained.

[Expression 23]

$$(y_1 C_{D\theta 1} - x_1 C_{L\theta 1})S_1 + (y_2 C_{D\theta 2} + x_2 C_{L\theta 2})S_2 + \quad (34)$$
$$2 y_S C_{D\theta S} S_S + (h_1 C_{Dn1} S_{n1} - h_2 C_{Dn2} S_{n2})\cos\beta +$$
$$2(n_2 b_2 - n_1 b_1) w_b \sin\beta / (\rho \alpha V^2) = 0$$

In a coordinate surface in which the connection point O of the net-towing wire 4 is an original in which an x-axis is horizontal and a y-axis is vertical, $x_1$, $y_1$, $x_2$, and $y_2$ are coordinates of points of action of flow resistances and lifts of the upper net and the lower net of the trawl net 13c, and $y_s$ is a coordinate of a point of action of a flow resistance of the side net of the trawl net 13c, which can be obtained as follows.

[Expression 24]

$$x_1 = d_{p1} \cos\theta_1 - b_1 \sin\beta \quad (35)$$

$$x_2 = d_{p2} \cos\theta_2 - b_2 \sin\beta \quad (36)$$

$$y_1 = b_1 \cos\beta - d_{p1} \sin\theta_1 \quad (37)$$

$$y_2 = b_{p2} \sin\theta_2 - b_2 \cos\beta \quad (38)$$

$$y_s = d_{pS} \sin(\beta - \gamma) \quad (39)$$

$d_{p1}$, $d_{p2}$, and $d_{pS}$ are distances between a pressure center and the net mouth at attack angles $\theta_1$, $\theta_2$, and $\theta_S$ of the upper net, the lower net, and the side net of the certain trawl net relative to the flow, which can be obtained as follows.

[Expression 25]

$$d_{p1} = l \cdot (1 - 0.75 \exp(-0.6/\theta_1)) \quad (40)$$

$$d_{p2} = l \cdot (1 - 0.75 \exp(-0.6/\theta_2)) \quad (41)$$

$$d_{pS} = l \cdot (1 - 0.75 \exp(-0.6/\theta_S)) \quad (42)$$

The expressions (35) to (42) can be obtained by calculation.

By substituting to the expression (34) the calculated results, the known data such as $S_1$, $S_2$, $S_S$, $S_{n1}$, and $S_{n2}$, and the desired frame inclination angle $\beta$, the appropriate inclination angle $\gamma$ of the net-mouth front edge of the side net of the trawl net 13c can be calculated.

Namely, the expression (34) gives the side-net front edge inclination angle $\gamma$ of the side-net front edge of the n-th trawl net from below at which the rotation moment becomes zero about the connection point O of the net-towing wire 4, when the desired inclination angle $\beta$ is provided to the frame.

To put it the other way around, in a case where the side-net front edge inclination angle $\gamma$ is provided to the side-net front edge of the n-th trawl net from below, when the frame is inclined at an angle other than the frame inclination angle β that is calculated by the expression (34), a rotation moment occurs about the connection point O of the net-towing wire 4. As a result, the inclination angle of the frame is stabilized at the inclination angle β, so that the posture of the frame can be maintained.

As shown in the expressions (20) and (21), the present invention utilizes the following feature. Namely, due to the provision of a side-net front edge inclination angle γ to the front edge of the side net of the n-th trawl net from below, attack angles $\theta_1$ and $\theta_2$ of the upper net and the lower net are varied, so that flow resistances and lifts acting on the upper net and the lower net of the trawl net are varied, whereby the frame can be autonomously stabilized and maintained at a predetermined combination of the frame inclination angle β and the side-net front edge inclination angle γ.

By providing a side-net front edge inclination angle γ of every trawl net to be towed relative to a predetermined frame inclination angle β, the inclination angle of the frame can be maintained at the certain inclination angle β, when every trawl net is switched to be opened.

However, there may be a case in which the side-net front edge inclination angles γ of the side-net front edges of all the trawl nets can satisfy the inclination angle β. In this case, an optimum frame inclination angle β, which can be satisfied by the inclination angles γ of the side-net front edges of the respective trawl nets, may be obtained by a maximum likelihood method or a calculation.

According to the present invention, as understood from the expression (34), since an effect given by a net-towing speed on a rotating force about the connection point O of the net-towing wire is small, the frame of the trawl-net collecting apparatus can be autonomously stabilized and maintained at a certain inclination angle even at a fast high net-towing speed.

Thus, the frame inclination of the trawl-net collecting apparatus can be maintained to be constant when the trawl nets are towed at a fast net-towing speed.

In addition, according to the present invention, the trawl net can autonomously stabilize an inclination angle of the frame to a certain angle with the aid of a flow resistance and a lift acting on the net. Thus, it is not necessary to uselessly increase a weight of the apparatus, and there can be obtained a lightweight trawl-net collecting apparatus of net-mouth inclination maintainable type that can stably maintains a frame at a certain inclination angle.

In the above embodiment, a frame inclination angle β is set such that the posture of the frame is maintained to be inclined forward. However, when an inclination angle γ of the side-net front edge of the trawl net is negative, the frame can be autonomously maintained to be inclined rearward.

In order to suitably position the connection point O of the net-towing wire 4 on the frame 2 in a high direction thereof, rotation moments caused by resistances at the frame parts above and below the connection point O of the net-towing wire 4 are taken into consideration.

In the above embodiment, there is described the trawl-net collecting apparatus of net-mouth inclination maintainable type in which the plurality of trawl nets are arranged in the up and down direction. However, the present invention is not limited to the case where a plurality of trawl nets are arranged in the up and down direction.

Namely, according to the present invention, when a single trawl net is disposed, by providing an inclination angle γ to a side-net front edge of the trawl net, the net mouth of the trawl net can be autonomously stabilized at a predetermined angle and such a posture can be maintained.

When taking a trawl net having a cod-end part by way of example, when an inclination angle γ of a side-net front edge and an inclination angle β of a front edge of a net mouth satisfy the following expression, a rotation moment about the connection point O of the net-towing wire becomes zero, with an effect of trawl nets positioned above and below a certain trawl net from the expression (34) being eliminated.

[Expression 26]

$$(y_1 C_{D\theta 1} - x_1 C_{L\theta 1})S_1 + (y_2 C_{D\theta 2} + x_2 C_{L\theta 2})S_2 + 2y_S C_{D\theta S} S_S = 0 \quad (43)$$

By substituting a desired inclination angle β of the front edge of the net mouth to the above expression (43), an inclination angle γ of the side-net front edge can be obtained.

Conversely, by providing the inclination angle γ to the side-net front edge, the net mouth of the trawl net can be autonomously stabilized at the desired inclination angle β, and such a posture can be maintained.

The invention claimed is:

1. A net-mouth inclined trawl-net apparatus comprising:
a substantially rectangular frame; and
a trawl net attached to the substantially rectangular frame, the trawl net being formed of an upper net, a lower net, and a pair of side nets, and the trawl net having a shape formed of a body part of a quadrangular trapezoid shape and a cod-end part connected to an end of the quadrangular trapezoidal body part,
wherein each of the side nets attached to the frame has a longer side and a shorter side as an upper side and a lower side, and a side of each side net defining a net-mouth edge defines a side-net front edge inclination angle (γ) relative to a bottom side of an isosceles trapezoid having the shorter side of the side net as a side of the isosceles trapezoid, so that the frame autonomously maintains an inclination angle (β) relative to the vertical axis due to a flow resistance and a lift acting on the net,
wherein the inclination angle (β) and the side-net front edge inclination angle (γ) satisfy the following expression:

$$\theta_1 = \theta_0 - (\beta - \gamma)$$

where $\theta_1$ is an attack angle of the upper net against the water flow, and $\theta_0$ is an inclination angle relative to a center line between the upper side and the lower side of the side net.

2. The net-mouth inclined trawl-net apparatus of claim 1, wherein a net-towing wire is connected to a predetermined high position of the frame in a high direction thereof.

3. A net-mouth inclined trawl-net apparatus comprising:
a plurality of trawl nets, each trawl net being formed of an upper net, a lower net, a pair of side nets, and each trawl net having a shape formed of a body part of a quadrangular trapezoid shape and a cod-end part connected to an end of the quadrangular trapezoidal body part; and
a substantially rectangular frame configured to tow the plurality of trawl nets arranged in an up and down direction on the frame, and the frame including an upper edge to which a net mouth edge of an upper net of the uppermost trawl net is anchored, and a lower edge to which a net mouth of a lower net of the lowermost trawl net is anchored;
a pair of vertical bars disposed on opposed sides of the frame; and
at least one substantially horizontal slide bar having opposed ends, the opposed ends being slidably engaged with the vertical bars, the slide bar anchoring thereto the net mouth edge of the lower net of the upper trawl net and the net mouth edge of the upper net of the lower trawl net;

wherein each of the side nets of at least one of the trawl nets has a longer side and a shorter side as an upper side and a lower side, and the at least one of the trawl nets is configured such that a side of each side net defining a net-mouth edge defines a side-net front edge inclination angle ($\gamma$) relative to a bottom side of an isosceles trapezoid having the shorter side of the side net as a side of the isosceles trapezoid, so that the frame autonomously maintains an inclination angle ($\beta$) relative to the vertical axis due to a flow resistance and a lift acting on the net, wherein the inclination angle ($\beta$) and the side-net front edge inclination angle ($\gamma$) satisfy the following expression:

$$\theta_1 = \theta_0 - (\beta - \gamma)$$

where $\theta_1$ is an attack angle of the upper net against the water flow, and $\theta_0$ is an inclination angle relative to a center line between the upper side and the lower side of the side net.

4. The net-mouth inclined trawl-net apparatus of claim 3, wherein the net-mouth edge of the side net of the trawl net is slidably anchored to the vertical bars.

5. The net-mouth inclined trawl-net apparatus of claim 4, wherein a net-towing wire is connected to a predetermined high position of the frame in a high direction thereof.

6. The net-mouth inclined trawl-net apparatus of claim 3, wherein a net-towing wire is connected to a predetermined high position of the frame in a high direction thereof.

7. The net-mouth inclined trawl-net apparatus of claim 3, wherein each of the trawl nets is configured with each of the side nets having a longer side and a shorter side as an upper side and a lower side, and each of the trawl nets is configured such that a side of each side net defining a net-mouth edge defines a side-net front edge inclination angle ($\gamma$) relative to a bottom side of an isosceles trapezoid having the shorter side of the side net as a side of the isosceles trapezoid, so that the frame autonomously maintains an inclination angle ($\beta$) relative to the vertical axis due to a flow resistance and a lift acting on the net, wherein the inclination angle ($\beta$) and the side-net front edge inclination angle ($\gamma$) satisfy the following expression:

$$\theta_1 = \theta_0 - (\beta - \gamma)$$

where $\theta_1$ is an attack angle of the upper net against the water flow, and $\theta_0$ is an inclination angle relative to a center line between the upper side and the lower side of the side net.

\* \* \* \* \*